(12) United States Patent
Kleyer

(10) Patent No.: US 7,756,696 B2
(45) Date of Patent: Jul. 13, 2010

(54) SIMULATION SYSTEM OF TECHNICAL PLANT

(75) Inventor: Dieter Kleyer, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 1453 days.

(21) Appl. No.: 10/212,864

(22) Filed: Aug. 7, 2002

(65) Prior Publication Data

US 2003/0033133 A1 Feb. 13, 2003

(30) Foreign Application Priority Data

Aug. 7, 2001 (EP) ................................. 01119042

(51) Int. Cl.
G06F 9/45 (2006.01)
G06F 15/16 (2006.01)
G06G 7/62 (2006.01)
G05B 13/04 (2006.01)
G01R 21/00 (2006.01)

(52) U.S. Cl. .............................. 703/18; 703/13; 703/22; 702/62; 700/47; 709/219

(58) Field of Classification Search .................. 703/13, 703/22; 700/47; 702/62
See application file for complete search history.

(56) References Cited

U.S. PATENT DOCUMENTS

| | | | | |
|---|---|---|---|---|
| 3,936,885 | A * | 2/1976 | Mutafelija | 376/217 |
| 4,545,766 | A * | 10/1985 | Schoessow | 434/218 |
| 4,568,288 | A * | 2/1986 | Patteson | 434/366 |
| 4,629,430 | A * | 12/1986 | Sakamoto | 434/219 |
| 4,977,529 | A * | 12/1990 | Gregg et al. | 703/18 |
| 5,249,458 | A * | 10/1993 | Sano et al. | 73/118.02 |
| 5,632,622 | A * | 5/1997 | Bothwell | 434/29 |
| 5,634,039 | A * | 5/1997 | Simon et al. | 703/18 |
| 5,752,008 | A * | 5/1998 | Bowling | 703/13 |
| 5,800,178 | A * | 9/1998 | Gillio | 434/262 |
| 6,026,386 | A * | 2/2000 | Lannert et al. | 706/45 |
| 6,048,366 | A * | 4/2000 | Ellis et al. | 703/8 |
| 6,072,946 | A * | 6/2000 | Dooley et al. | 703/13 |
| 6,289,299 | B1 * | 9/2001 | Daniel et al. | 703/21 |
| 6,371,765 | B1 * | 4/2002 | Wall et al. | 434/224 |
| 6,442,512 | B1 * | 8/2002 | Sengupta et al. | 703/6 |
| 6,618,745 | B2 * | 9/2003 | Christensen et al. | 709/201 |
| 6,745,170 | B2 * | 6/2004 | Bertrand et al. | 706/45 |
| 6,944,584 | B1 * | 9/2005 | Tenney et al. | 703/22 |

(Continued)

OTHER PUBLICATIONS

Dan Benson, Chellury Sastry, Jurgen Heilmann, and Horst Hofmann, Power Plant MOM (Multimedia Operation & Monitoring), Apr. 16, 1997, 1-9.*

Z. Jianhua, L. Lianguang, L. Yingli, Z. Qiong, T. Hongzhu, and Q. Henan, "A New Type of Simulation System Combining Operation Training and Knowledge Training," North China Electric Power University, PDF file Created on Aug. 23, 1998, total pages of five and extra page showing the date of PDF file creation.*

(Continued)

*Primary Examiner*—Kamini S Shah
*Assistant Examiner*—Kibrom Gebresilassie
(74) *Attorney, Agent, or Firm*—Harness, Dickey & Pierce, P.L.C.

(57) ABSTRACT

A simulation system includes a simulation computer having a Web server and a client computer with an Internet browser. On the simulation computer, a process engineering process model of a technical plant is available, to which access can be made by the client computer via the Internet. In preferred embodiments, the simulation computer additionally includes an automation engineering process model of the technical plant, operation and observation software and a project engineering tool for changing the aforementioned programs in the simulation computer.

12 Claims, 1 Drawing Sheet

U.S. PATENT DOCUMENTS

| | | | |
|---|---|---|---|
| 7,072,987 B2 * | 7/2006 | Jurisch et al. | 709/249 |
| 7,082,379 B1 * | 7/2006 | Bickford et al. | 702/178 |
| 7,257,523 B1 * | 8/2007 | Nixon et al. | 703/13 |
| 7,409,711 B1 * | 8/2008 | Sakadjian | 726/22 |
| 2002/0127525 A1 * | 9/2002 | Arington et al. | 434/262 |
| 2003/0054323 A1 * | 3/2003 | Skaggs | 434/29 |
| 2003/0120472 A1 * | 6/2003 | Lind | 703/13 |
| 2003/0139837 A1 * | 7/2003 | Marr | 700/110 |
| 2003/0211450 A1 * | 11/2003 | Sofia et al. | 434/350 |
| 2003/0211451 A1 * | 11/2003 | Bergeron et al. | 434/362 |
| 2003/0214533 A1 * | 11/2003 | Cull et al. | 345/771 |
| 2004/0255017 A1 * | 12/2004 | Jurisch et al. | 709/223 |
| 2005/0021705 A1 * | 1/2005 | Jurisch | 709/223 |
| 2005/0095572 A1 * | 5/2005 | Comer et al. | 434/362 |

OTHER PUBLICATIONS

D. Benson, C. Sastry, J. Heilmann, and H. Hofmann, "Power Plant MOM (Multimedia Operation and Monitoring)," Siemens Corporate Research, Princeton, PDF file Created on Mar. 16, 1997, pp. 1-9 and extra page showing the date of PDF file creation.*

Z. Jianhua, L. Lianguang, L. Yingli, Z. Qiong, T. Hongzhu, and Q. Henan, "A New Type of Simulation System Combining Operation Training and Knowledge Training," herein referred as Jianhua, North China Electric Power University, PDF file Created on Aug. 23, 1998.*

D. Benson, C. Sastry, J. Heilmann, and H. Hofmann, "Power Plant MOM (Multimedia Operation and Monitoring)," herein referred as Benson, Siemens Corporate Research, Princeton, PDF file Created on Mar. 16, 1997.*

Z. Jianhua, L. Lianguang, L. Yingli, Z. Qiong, T. Hongzhu, and Q. Henan, "A New Type of Simulation System Combining Operation Training and Knowledge Training," North China Electric Power University, PDF file Created on Aug. 23, 1998.*

D. Benson, C. Sastry, J. Heilmann, and H. Hofmann, "Power Plant MOM (Multimedia Operation and Monitoring)," Siemens Corporate Research, Princeton, PDF file Created on Mar. 16, 1997.*

Paul G. Backes, Kam S. Tso, and Gregory K. Tharp; "The Mars Pathfinder Mission Internet-Based WITS Rover Planning and Simulation System"; 1998 IEEE; pp. 151-157.

Chandrashekar, B., et al., "A Project Engineering Tool to Assist in the Development and Maintenance of Project Life Cycles" Computer Science Department, Oklahoma State University, Stillwater, OK 74078-0599, Applied Computing, 1991., [Proceedings of the 1991] Symposium, Apr. 3-5, 1991 pp. 119-122.

Siemens "TELEPERM XP, ES 680 Process engineering and commissioning tool" User Manual. Order-No. 6DP6810-2FA01, Issue 6.3, Oct. 1, 1999. (4 pp.).

Siemens "TELEPERM XP, Engineeringsystem ES 680 Process Engineering and Commissioning Tool Overview," User Manual, Order-No. 6DP6810-2FA01, Issue 6.0, Oct. 1, 1998.

Siemens "TELEPERM XP, Engineeringsystem ES 680 Process Engineering and Commissioning Tool Guidelines for engineering of AS, OM and LAN" User Manual, Order-No. 6DP6810-2FA01, Issue 6.3, Oct. 1, 1999.

* cited by examiner

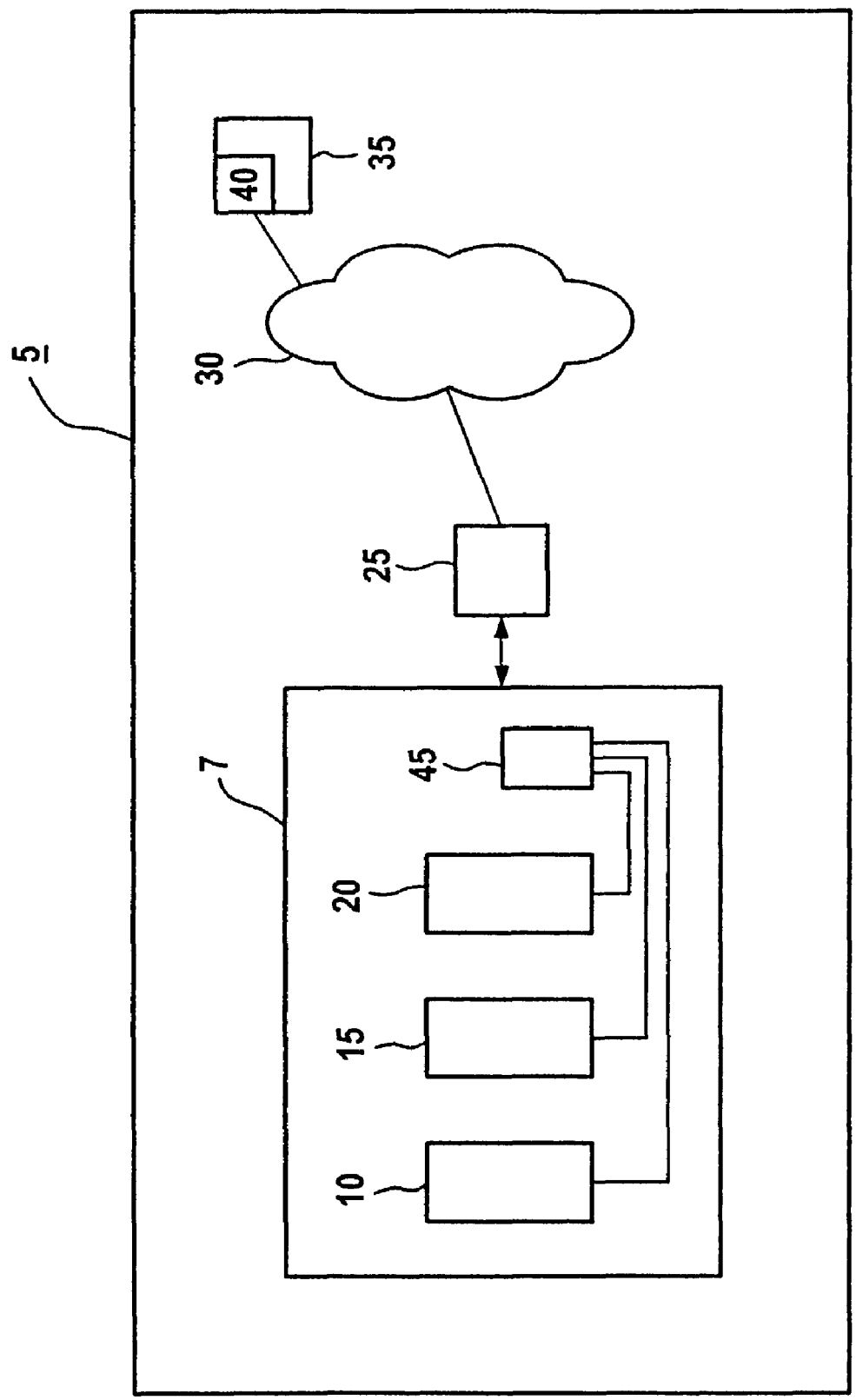

SIMULATION SYSTEM OF TECHNICAL PLANT

This application claims priority of European Patent Application No. 01119042.8, filed Aug. 7, 2001, the entire contents of which are hereby incorporated by reference.

FIELD OF THE INVENTION

The invention generally relates to a simulation system. More preferably, it relates to one by means of which, in particular, the maintenance personnel of the power station for producing electrical power can be trained.

BACKGROUND OF THE INVENTION

Training simulators are increasingly used to train maintenance personnel for the operation of a power station and to train them about exceptional situations and critical operating states which can occur during the actual operation of the power station. Whereas in the past such simulators were almost exclusively used in large plants which, in terms of their construction and operation, are generally individual solutions, nowadays simulators are also increasingly used for training purposes even in smaller plants. In particular, they are used in the case of gas and steam plants, which are very similar in terms of their basic mode of operation, even given a different embodiment.

In order to simulate the operation of a power station plant as realistically as possible on a computer, it is necessary to simulate both the process engineering process which proceeds in a real power station and relates to the operating behavior and interaction of the power station components, and also the automation engineering process, which includes the process control system used for operation and control with its automation and operation and observation components, with the aid of complex software.

The outlay necessary for this purpose normally requires a gigantic computing power of the simulation computer used. The hardware for the simulation computer has to be constructed, installed and maintained at every training location.

Such training simulators, installed on site, are normally only used for part of the time.

SUMMARY OF THE INVENTION

An embodiment of the invention, therefore, may be based on an object of specifying a simulation system, in particular for use for training purposes for the operation of a power station plant, which can be used flexibly, does not give rise to high investment costs and/or, in particular, is suitable for the simulation of a plurality of power station plants. Furthermore, the installation location of the simulation system may be virtually freely selectable, so that the necessity to install the simulation system directly at or in the power station plant is overcome.

According to an embodiment of the invention, an object may be achieved by a simulation system which comprises the following components:

a) at least one simulation computer, which comprises at least one process engineering process model of a technical plant to be simulated as a software program, and a Web server for connecting to the Internet and/or an Intranet, so that access to the process model can be made via the Internet and/or the Intranet, and b) at least one client computer, which comprises an Internet browser for connecting the client computer to the Internet and/or the Intranet.

Here, an embodiment of the invention may be based on an idea that, as a result of the availability of the Internet, the client computer with which the simulation system is operated can be separated physically from the simulation computer which contains the process model for the simulation of the power station plant. As a result, it is also possible to implement process models for different power station plants in the simulation computer, to which access can then specifically be made, via the Internet, from various sites, for example for training purposes. It is therefore no longer necessary to provide a separate simulation computer, which is normally very costly, for each power station plant. Maintenance personnel to be trained in a power station plant merely have to have a client computer, which substantially has to have only a widespread and well-known Internet browser; specific software generally does not have to be installed on the client computer.

The simulation system can be used particularly advantageously for the training of the maintenance personnel of gas and steam plants, since these plants are in general distinguished by a similar plant construction, and the control mode and operation of gas and steam plants do not differ from one another in principle, so that the basic requirements on control mode and operation of gas and steam plants are virtually identical. The simulation computer which, for example, contains a process model of a gas and steam plant, can then advantageously be used for training purposes by the maintenance personnel of a plurality of different gas and steam plants. Simulation computers of this type can be used as basic simulators for a series of gas and steam plants, since they fulfill the elementary requirements on training to be carried out. These simulation computers, constructed in particular as basic simulators, can be made available on central computers and, with the aid of Internet technology, can be used at virtually any training site.

With the aid of the process engineering process model, the process engineering components of the power station plant are simulated. Here, for example, the process engineering processes proceeding in the power station plant and the plant engineering implementation of the power station plant, for example with boiler, heater, pipelines, valves, pumps and their instrumentation, are simulated. In addition, with the process engineering process model, the startup and shutdown of the process engineering process or else load fluctuations and their effects on the aforementioned process can be simulated. Furthermore, it is possible to simulate faults and critical states in the process engineering process, to save them as an instantaneous record (snapshot) and, if necessary, to repeat them for training purposes. The process engineering process model can simulate the process engineering process in real time, in slow mode or in fast mode. Provision can likewise be made to stop and/or freeze the simulated process engineering process.

Plant-specific extensions, adaptations and optimizations of the process engineering process model are performed via project engineering tools, which are advantageously comprised by the process engineering process model. As a result, it is possible to change the process engineering process model at any time. The access to and the operation of the project engineering tool is preferably carried out via the Internet by the client computer.

In an advantageous refinement of an embodiment of the invention, the simulation computer contains an automation engineering process model belonging to an automation engineering device used for monitoring, controlling and/or regulating the technical plant, as a software program.

A power station plant, in addition to the process engineering components already previously mentioned, which implement the process engineering process, also comprises the automation components, by which the process engineering process is operated, controlled and/or regulated, so that the plant components interact in a desired manner. Programmable logic controllers (PLC) are often concerned here, which contain one or more control programs for the operation of at least one plant component, for example a unit such as a motor, a pump and so on. Automation devices of this type are therefore used, inter alia, to ensure the contribution of a plant component to the desired process engineering process, by the plant components being kept in a desired operating state, for example via the control program running in the automation device.

The automation engineering process model accordingly simulates the behavior of the automation devices, in particular their control actions on plant components. If specific hardware solutions are used for automation in the real power station plant, then these are advantageously likewise comprised by the automation engineering process model.

Particularly advantageously, the simulation computer comprises an O&O software program for the operation and observation of the technical plant, which is also used virtually unchanged in an operation and observation system of the technical plant.

In the real power station plant, an operation and observation system is normally used, whose software runs on a standard operating system. By use of this O&O software program, for example, a graphical representation of process images with the current measured values can be displayed and/or, for example, a plant component can be operated and/or stored archived data can be called up and/or fault messages, message lists, etc. can be called up.

Since the O&O software program on the operation and observation system of the power station plant, as mentioned, normally runs on a standard operating system, this O&O software program can also run virtually unchanged on the simulation computer, since the latter is preferably likewise operated by means of a standard operating system.

It is therefore not necessary to simulate the O&O software program of the real power station plant on the simulation computer by a model; instead the original O&O software program of the operation and observation system of the real power station plant can be used on the simulation computer.

By use of the client computer, access to the simulation computer can be made via the Internet, and the O&O software program installed there can be operated. The user of the client computer then has the feeling of sitting in front of the original operation and observation system of the real power station plant and of operating and observing the real plant.

The simulation computer advantageously contains a project engineering tool as a software program, by which the process engineering process model and/or the automation engineering process model and/or the O&O software program can be changed.

In this advantageous refinement of an embodiment of the invention, it is very simple for a user of the simulation system to change the process engineering process model and/or the other aforementioned software components of the simulation system, in order for example to adapt the simulation system to the changing conditions in the real power station plant or in order to provide training about specific operating situations, in particular critical situations.

In a further advantageous refinement of an embodiment of the invention, it is possible, by use of the at least one client computer, to make specific access via the Internet to each of the software programs which are comprised by the simulation computer and which relate to the simulation of the technical plant.

In this way, no specific computers are necessary in order to operate the various aforementioned software programs of the simulation computer, even individually if required. In one case, for example, merely the simulation of the process engineering process may be desired, while, in another case, the simulation of the automation engineering devices of the power station plant forms the focus.

The client computer can therefore, so to speak, access the simulation computer "from various points of view", without specialized computers being needed in each case for these various accesses.

BRIEF DESCRIPTION OF THE DRAWINGS

An exemplary embodiment of the invention will be illustrated in more detail in the following text and FIGURE, wherein:

The FIGURE shows a simulation system according to an embodiment of the invention, which simulates the process engineering process, the automation engineering and the operation and observation system of a power station plant.

DETAILED DESCRIPTION OF THE PREFERRED EMBODIMENTS

The FIGURE illustrates a simulation system 5, which can advantageously be used for the training of maintenance personnel belonging to a technical plant, which can be constructed as a power station plant.

The simulation system 5 comprises a simulation computer 7, on which the essential software engineering models for the simulation are stored. These are substantially:

a) a process engineering process model 10, which simulates the process engineering process running in the technical plant, such as a gas and steam process, which is produced by a series of interacting plant components (boiler, heater, pipelines, valves, pumps, instrumentation and so on), for example by means of a graphical display of the plant components and of the connections between the latter and a mathematical model comprising a set of equations, which places the dependent and independent variables of the process in relation to one another and whose solution (following the input or predefinition of the independent variables) describes in mathematical terms, for example, the time behavior of the variables of the process and therefore the process, and b) an automation engineering process model 15, which simulates the functionality of automation devices which are used in the real technical plant for monitoring and controlling and/or regulating plant components; the automation process model 15 preferably comprises a further set of mathematical equations, in particular for the simulation of the control and/or regulation algorithms used in the automation devices; if automation functions are implemented in the real technical plant in the form of a hardware solution (for example for reasons of availability and/or the requisite fastest possible processing of the function), then these functions are comprised by the automation engineering process model 15.

The simulation computer 7 also contains an O&O software program 20, which makes the functionality of an operation and observation system used in the real technical plant available on the simulation computer 7. This O&O software program is preferably substantially identical to the software program which is used on the real operation and observation system; to this extent, no simulation of this system is necessary.

In addition, the simulation computer 7 has a project engineering tool 45, by means of which the abovementioned programs 10, 15, 20 can be changed, so that the simulation system can be adapted particularly easily to changed requirements and/or a changed technical plant. The project engineering tool 45 is suitable in particular to change one or more of the programs 10, 15, 20 in such a way that operating situations in the technical plant can be simulated which could not be generated on the real technical plant without endangering personnel and/or material, in particular critical operating situations. In this way, the maintenance personnel can practice dealing with operating situations of this type, which do not occur every day, and can learn how to master them.

The simulation computer is connected to the Internet 30 via a Web server 25, so that by use of a client computer 35 which comprises an Internet browser 40, access to the simulation computer via the Internet 30 is made possible. In this case, the Web server 25 provides an interface, via which the programs 10, 15, 20 which permit the simulation of the technical plant are accessible via the Internet 30 from any desired location with Internet access, and can be used by means of the client computer 35.

The simulation computer 7 can include a plurality of process engineering process models 10, a plurality of automation engineering process models 15, and a plurality of O&O software programs 20, which are associated with real technical plants that are different from one another. It is thus possible, by using a single simulation computer 7 at a central point, to provide the essential "simulation modules" for a number of technical plants, to which modules access can then be made from any desired locations, even ones differing from one another, via the Internet 30, specifically by use of one or else a plurality of physically distributed client computers 35.

Furthermore, one or more of the programs 10, 15, 20 can be configured in such a way that they simulate the essential characteristics and the basic behavior of a specific type of a real technical plant, in particular a gas and steam power station plant. In this way, via the simulation computer, a "basic simulator" is formed which can be used as a training instrument for a number of real technical plants of the same type, but not necessarily of the same design. As a result, the outlay for the provision of a simulation system which can be used for training purposes for a number of real technical plants is minimized. Furthermore, the utilization of the simulation system is optimized at the same time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A simulation system for simulating a technical plant, the simulation system comprising:
at least one simulation computer, including
at least one process engineering process model of a technical plant to be simulated as a software program, the process engineering process model being configured to simulate a process engineering process running in the technical plant, the technical plant being produced by a series of interacting plant components and a mathematical model, the interacting plant components being represented by a graphical display of the interacting plant components and of connections between the interacting plant components, and the mathematical model including a set of equations including dependent and independent variables of the process engineering process,
an automation engineering process model belonging to an automation engineering device used for at least one of monitoring, controlling and regulating the technical plant, as a software program, the automation engineering process model being configured to simulate functionality of automation devices, which are used in an actual technical plant, for at least one of monitoring, controlling and regulating plant components, the automation process model including a further set of mathematical equations for simulating at least one of control and regulation algorithms used in the automation devices, wherein
if automation functions are implemented in the actual technical plant in the form of a hardware solution, the automation functions include the automation engineering process model,
a Web server for connecting to at least one of an Internet and an Intranet, so that access to the process model can be made via at least one of the Internet and the Intranet, and
an O&O software program for operation and observation of the simulated technical plant; and
at least one client computer, including an Internet browser for connecting the at least one client computer to at least one of the Internet and the Intranet; wherein
the simulation computer includes a project engineering tool as a software program, the project engineering tool being capable of changing at least one of the process engineering process model, the automation engineering process model and the O&O software program,
the at least one client computer accesses, via the internet, each of the software programs on the simulation computer for simulating the technical plant, and
the same O&O software program is for executing on both the simulation computer and at an actual technical plant for operation and observation of the actual technical plant.

2. The simulation system of claim 1, wherein the technical plant is a power plant.

3. The simulation system of claim 1, wherein the power plant is a gas or steam plant.

4. The simulation system of claim 1, wherein the simulation of the technical plant includes at least one of simulation of startup and shutdown of an engineering process.

5. The simulation system of claim 1, wherein an engineering process is simulated in real-time, slow mode or fast mode.

6. The simulation system of claim 1, wherein the project engineering tool is a software tool for design, analysis and construction of works for practical purposes.

7. The simulation system of claim 1, wherein the client computer and the simulation computer are configured such that the client computer is capable of operating the simulation computer, the client computer being geographically separated from the simulation computer.

8. The simulation system of claim 1, wherein the simulation computer includes a plurality of process models.

9. The simulation system of claim 1, wherein the at least one simulation computer simulates a plurality of technical plants, and the simulation computer is not co-located with the technical plant.

10. The simulation system of claim 1, wherein the at least one client computer is co-located with the technical plant and the at least one simulation computer is geographically separated from the technical plant and the at least one client computer, and wherein the at least one client computer accesses, via the Internet browser, the at least one process engineering process model, the automation engineering process model and the O&O software program to execute simulation of the technical plant.

11. The simulation system of claim 10, wherein the at least one simulation computer includes a plurality of process models, each of the plurality of process models simulating one of a plurality of technical plants.

12. The simulation system of claim 10, wherein the at least one client computer executes and controls the simulation of the technical plant being run on the at least one simulation computer via the Internet browser.

* * * * *